United States Patent
Raviola et al.

(10) Patent No.: US 10,019,467 B2
(45) Date of Patent: Jul. 10, 2018

(54) METHOD, SYSTEM AND COMPUTER READABLE MEDIUM FOR MANAGING DESIGN UPDATES IN A MANUFACTURING EXECUTION SYSTEM

(71) Applicant: SIEMENS AKTIENGESELLSCHAFT, Munich (DE)

(72) Inventors: Alessandro Raviola, Genoa (IT); Elena Reggio, Genoa (IT)

(73) Assignee: Siemens Aktiengesellschaft, Munich (DE)

( * ) Notice: Subject to any disclaimer, the term of this patent is extended or adjusted under 35 U.S.C. 154(b) by 585 days.

(21) Appl. No.: 14/557,655

(22) Filed: Dec. 2, 2014

(65) Prior Publication Data
US 2015/0153723 A1    Jun. 4, 2015

(30) Foreign Application Priority Data

Dec. 3, 2013    (EP) ..................................... 13195473

(51) Int. Cl.
*G06F 19/00*    (2018.01)
*G06F 17/30*    (2006.01)
(Continued)

(52) U.S. Cl.
CPC .   *G06F 17/30309* (2013.01); *G05B 19/41865* (2013.01); *G06Q 10/06* (2013.01);
(Continued)

(58) Field of Classification Search
CPC ........ G06F 17/30309; G05B 19/41865; G05B 2219/31372; G05B 2219/32096; G06Q 10/06; G06Q 10/0631
See application file for complete search history.

(56) References Cited

U.S. PATENT DOCUMENTS 6,128,588 A    10/2000  Chacon
7,890,927 B2 *  2/2011  Eldridge ................ G05B 15/02
                                                    700/86
(Continued)

FOREIGN PATENT DOCUMENTS

EP    2040204 A1    3/2009
EP    2244214 A1    10/2010
EP    2639753 A1    9/2013

OTHER PUBLICATIONS

Mouli, Chandra. "Next generation Manufacturing Execution System (MES) enabling fully integrated fab automation in 300mm technology development and manufacturing." Advanced Semiconductor Manufacturing Conference and Workshop, 2005 IEEE/SEMI. IEEE, 2005.*
(Continued)

*Primary Examiner* — Michael D Masinick
(74) *Attorney, Agent, or Firm* — Laurence Greenberg; Werner Stemer; Ralph Locher

(57) ABSTRACT

In a method and a system for managing product definition updates for controlling a manufacturing process via a MES system, design information entities each defining manufacturing specifications for a specific product and including sets of data concerning different manufacturing steps are downloaded to the MES system. At the first download, first and second MES information entities are created and stored. The first entities have associated second entities each including data for a manufacturing step and include links to the associated second entities. At each update of a design information entity, a differential package including the whole of the data for a set having undergone changes and for newly added sets, and an identification for unchanged sets, is downloaded. A new version of the second entities corresponding to sets having undergone changes and/or additional second entities corresponding to sets of data that have been added are created and stored.

7 Claims, 3 Drawing Sheets

(51) Int. Cl.
*G06Q 10/06* (2012.01)
*G05B 19/418* (2006.01)
(52) U.S. Cl.
CPC ............ *G06Q 10/0631* (2013.01); *G05B 2219/31372* (2013.01); *G05B 2219/32096* (2013.01); *Y02P 90/12* (2015.11); *Y02P 90/20* (2015.11); *Y02P 90/265* (2015.11)

(56) References Cited

U.S. PATENT DOCUMENTS

| | | | |
|---|---|---|---|
| 8,023,500 B2* | 9/2011 | Thibault | G05B 19/41835 370/386 |
| 8,032,243 B2 | 10/2011 | Raviola et al. | |
| 8,301,274 B2 | 10/2012 | Raviola et al. | |
| 8,463,964 B2* | 6/2013 | Kostadinov | G05B 19/042 700/86 |
| 2002/0156548 A1* | 10/2002 | Arackaparambil | G05B 19/41845 700/108 |
| 2002/0188622 A1* | 12/2002 | Wallen | G05B 19/4097 |
| 2013/0245805 A1 | 9/2013 | Reggio et al. | |
| 2016/0154911 A1* | 6/2016 | Altare | G06Q 10/06 703/13 |

OTHER PUBLICATIONS

Cheng, Fan-Tien, et al., "Development of a distributed object-oriented system framework for the computer-integrated manufacturing execution system", Proceedings of the 1998 IEEE International Conference on Robotics & Automation, May 1998, Leuven, Belgium.

\* cited by examiner

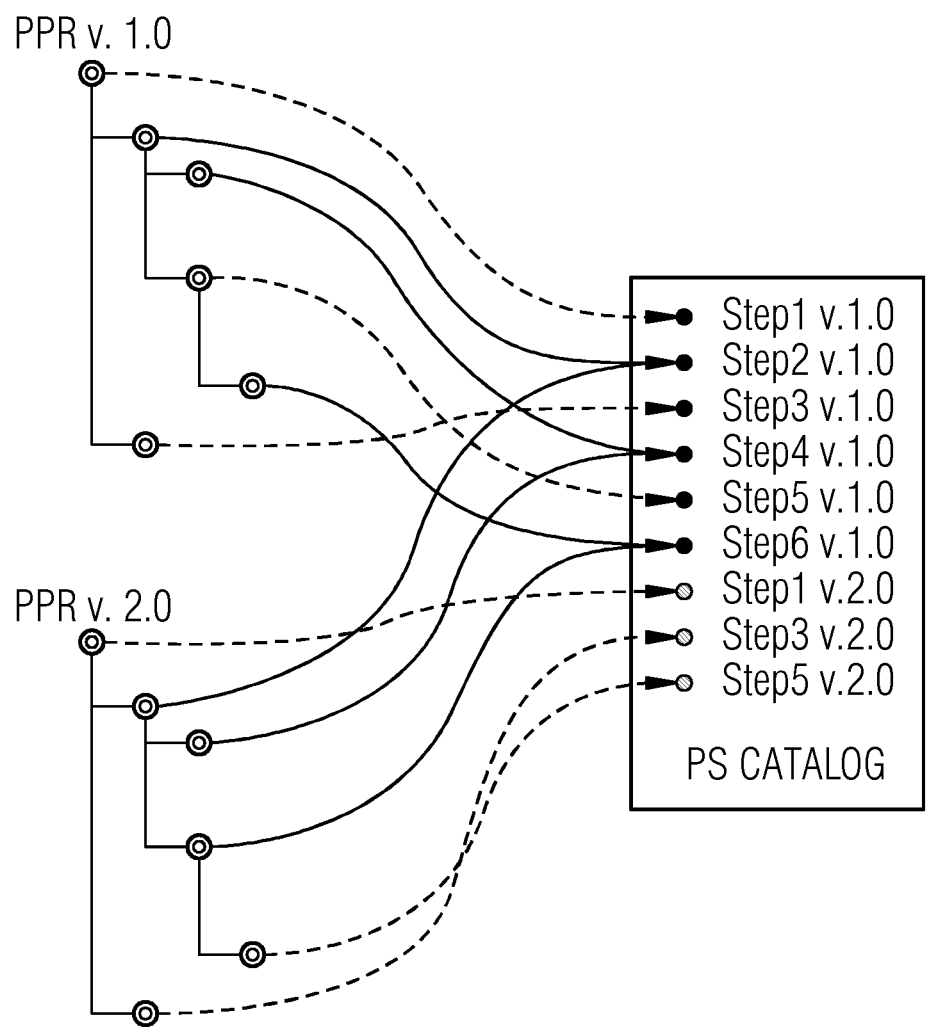

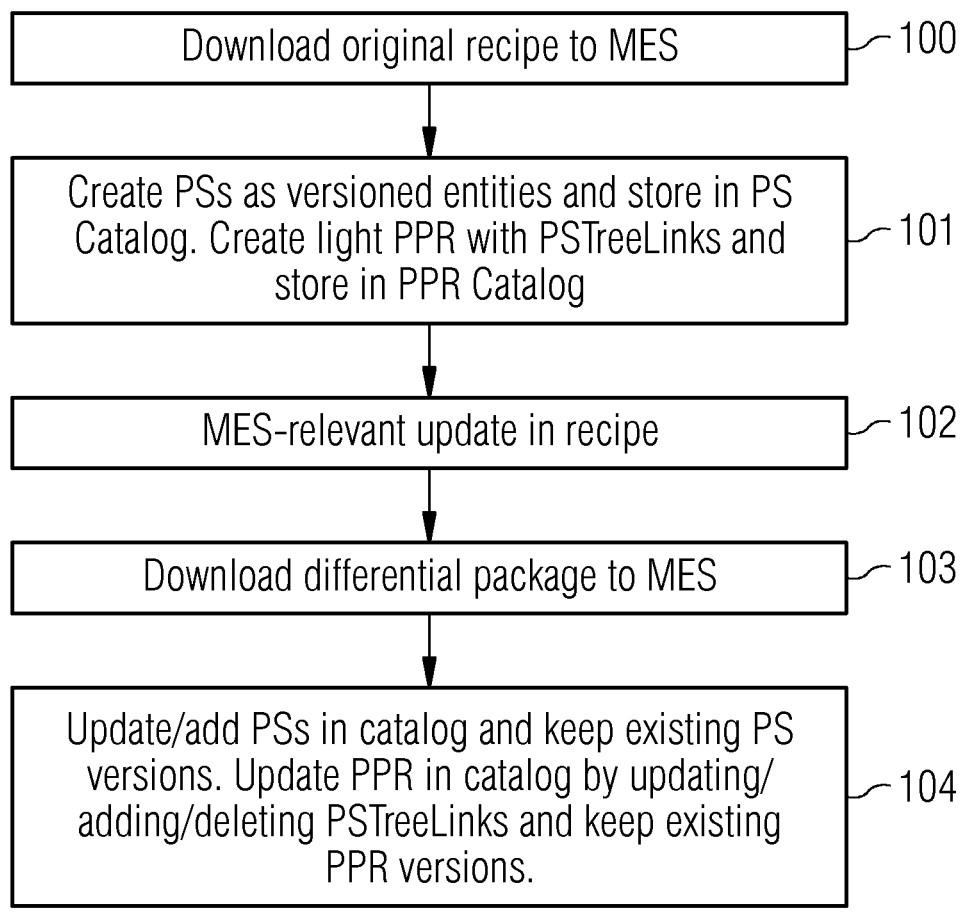

METHOD, SYSTEM AND COMPUTER READABLE MEDIUM FOR MANAGING DESIGN UPDATES IN A MANUFACTURING EXECUTION SYSTEM

CROSS-REFERENCE TO RELATED APPLICATION

This application claims the priority, under 35 U.S.C. § 119, of European application EP 13195473.7, filed Dec. 3, 2013; the prior application is herewith incorporated by reference in its entirety.

BACKGROUND OF THE INVENTION

Field of the Invention

The invention relates to a method of and a system for managing design updates in manufacturing process control, especially in a production facility employing a computer managed manufacturing execution system (MES).

As defined by the Manufacturing Enterprise Solutions Association (MESA International), a MES system "is a dynamic information system that drives effective execution of manufacturing operations", by managing "production operations from point of order release into manufacturing to point of product delivery into finished goods" and by providing "mission critical information about production activities to others across the organization and supply chain via bi-directional communication."

The functions that MES systems usually include, in order to improve quality and process performance of manufacturing plants, are resource allocation and status, dispatching production orders, data collection/acquisition, quality management, maintenance management, performance analysis, operations/detail scheduling, document control, labor management, process management and product tracking.

For example, Siemens Corporation offers a broad range of MES products, under its SIMATIC® product family.

Typically, at engineering time, MES client applications are used by system engineers for customizations according to the specific manufacturing plant requirements. Instead, at runtime, MES client applications are utilized by end-users such as plant operators or line responsible personnel.

An accurate modeling of the manufacturing process is essential for both scheduling and execution and to eventually achieve a good level of operational performance in manufacturing activities.

A well known example of a model for manufacturing is found in a standard called ISA-595. The standard ISA-S95 is an extension by a batch mode of the ANSI/ISA-88 standard for process control engineering in manufacturing, applicable for discrete and continuous production types. It defines schemes for the individual production steps, the schemes containing rules about information exchange between different production phases required in the manufacturing execution system.

The ISA-S95 standard is the common basis used for the development of MES systems. It consists of several parts each of them with a specific scope. In particular, Part 2 of the ISA-S95 standard [A] deals with the object model representing the entities involved in a manufacturing process, by defining models for production capabilities, process segment capabilities, personnel, equipment, materials, process segments, product definition information, production schedules and production performance. Such entities represent the resources to be used during the execution of a production request or order.

In particular, the ISA-S95 standard proposes a product definition model defining the exchange of information among different MES entities. Among such entities, the product production rules ("PPR", also known as "production rules") and the product segments ("PS", also known as "production phases") are of interest for the present invention. Here below are reported the respective definitions as written in Part 1 of the ISA-S95 standard [B]:

a) "Production rules—The information used to instruct a manufacturing operation how to produce a product."; and b) "Product segments—The shared information between a plan-of-resources and a production-rule for a specific product. It is a logical grouping of personnel resources, equipment resources, and material specifications required to carry out the production step".

In such a product definition model, a PPR is created e.g. when downloading a so called "recipe" from an external engineering or design environment, i.e. an Enterprise Resource Planning (ERP) or a Product Lifecycle Management (PLM), in order it is executed. As defined in part 1 of ANSI/ISA-88 standard [C], a recipe is "the necessary set of information that uniquely defines the production requirements".

When the external engineering environment changes a recipe that was already delivered to the MES system, the problem arises of keeping the related PPR aligned with these modifications.

The standard has no special provision for this issue. By using the standard mechanisms, the whole of the updated recipe would be delivered to the MES system, thereby defining a new PPR version on the MES side. The result is having several PPR versions that are mostly identical in the structure, except for a small subset of information, that might regard for instance some process parameters, some raw materials or some additional steps. Clearly, this is not the optimal approach in terms of performance and data duplication, especially if the recipe steps, and hence the PPR steps and the PSs, have a huge information content.

Another possible solution could be delivering only the differences to the MES system. This means that the MES system must be able to apply the changes to the related PPR, first creating a new version from the existing one and then updating each PS with the right changes. Even this solution could have some drawbacks in terms of performance, especially if the PPR has a huge number of PSs.

SUMMARY OF THE INVENTION

It is an object of the invention to provide a method and a system for managing design updates in a MES system, which overcome the above drawbacks.

The object is achieved through a method and a system for managing product definition updates for controlling a manufacturing process via a MES system. The method includes:

a) downloading from an external engineering environment to the MES system design information entities each defining manufacturing specifications for a specific product and including sets of data concerning different manufacturing steps, which design information entities and sets of data are updated whenever the specifications for the respective product change and are downloaded to the MES system at their creation and at each update entailing MES-relevant changes;

b) creating within the MES system, at the first download of a design information entity, first and second MES information entities (in short, first and second entities) where each first entity has associated second entities each including data for a manufacturing step for that product, the creating step including:

b1) creating a new version of the second entities at each download of an updated corresponding design information entity and storing the second entities with their data into a database of the second entities;

b2) creating a new version of the first entity at each download of an updated corresponding design information entity by including into the first entity, for each second entity associated thereto, a link to the second entity in said database; and b3) storing the first entities into a database of the first entities;

the invention further includes creating the second entities as versioned entities and, at each download of an updated design information entity:

c) downloading a differential package including the whole of the data for a set having undergone changes and for newly added sets, and an identification of unchanged sets;

d) creating and storing into the database of the second entities a new version of the second entities corresponding to sets having undergone changes and/or additional second entities corresponding to sets of data that have been added; and e) creating a new version of the first entity by:

e1) replacing, for an updated second entity, the link to an existing version of the entity by a link to the new version thereof;

e2) adding links to newly created second entities; and e3) deleting links to second entities corresponding to sets of data deleted from a design information entity.

The problem of data duplication is dealt with by published, European patent application EP 2639753 A1, corresponding to U.S. patent publication No. 2013/0245805. As far as the engineering phase (product definition) is concerned, the document deals with additional resources that can be handled in the product definition, but it does not disclose or suggest anything about synchronization of the product definition with the updates downloaded from an external engineering environment.

In embodiments of the invention, in the case of a hierarchical structure of the design information entities, the differential package further includes information about a level of hierarchy immediately below a set of data having undergone changes.

In embodiments of the invention, the first and second entities belong to a product definition model taken from the ISA-S95 standard and are product production rule entities and product segment entities, respectively.

Furthermore, a computer program element can be provided, containing computer program code for performing steps according to the above mentioned method when loaded in a digital processor of a computing device.

Additionally, a computer program product stored on a computer usable medium can be provided, containing computer readable program code for causing a computing device to perform the mentioned method.

Thanks to the introduction of the PS versioning in the PS catalog and the use of light PPRs linking the proper PS version in the catalog, embodiments of the invention prevent data duplication and inefficient management of the hardware and software resources.

Thanks to keeping both the original and the updated versions of a PS in the catalog and to enabling the possibility that a PS has multiple parents, embodiments of the invention allow recycling the consolidated production steps, linking them from different PPRs or different PPRs versions, and avoid massive modifications of the same data. In fact the engineer can modify the PS and automatically propagate the change in each PPR that links it through a PSTreeLink.

This approach can bring important improvements in the interaction between a MES system and an external engineering environment, improving flexibility and scalability to better compete in the market.

With the foregoing and other objects in view there is provided, in accordance with the invention, a system for managing product definition updates for controlling a manufacturing process via a manufacturing execution system (MES system), the system contains:

a) means (e.g. computer, processor, memory and/or software) for downloading from an external engineering environment to the MES system design information entities each defining manufacturing specifications for a specific product and including sets of data concerning different manufacturing steps, the design information entities and the sets of data are updated whenever specifications for a respective product change and are downloaded to the MES system at creation and at each update entailing MES-relevant changes;

b) means (e.g. computer, processor, memory and/or software) for creating within the MES system, at a first download of a design information entity, first and second MES information entities where each first MES information entity having associated second MES information entities each including data for a manufacturing step for the specific product, said means for creating the first and second MES information entities creating the second MES information entities as versioned entities, said means for creating further including:

b1) means (e.g. computer, processor, memory and/or software) for creating a new version of the second MES information entities at each download of an updated corresponding design information entity and storing the second MES information entities with their data into a database of the second MES information entities;

b2) means (e.g. computer, processor, computing unit or software) for creating a new version of the first MES information entity at each download of the updated corresponding design information entity by including into the first MES information entity, for each second MES information entity associated thereto, a link to the second MES information entity in said database; and b3) means (e.g. computer, processor, memory and/or software) for storing the first MES information entities into a database of the first MES information entities;

c) means (e.g. computer, processor, memory and/or software) for downloading a differential package including a whole of the data for a set having undergone changes and for newly added sets, and an identification of unchanged sets;

d) means (e.g. computer, processor, memory and/or software) for creating and storing into the database a new version of the second MES information entities corresponding to sets having undergone changes and/or additional second MES information entities corresponding to sets of data that have been added, while maintaining existing versions of the second MES information entities for reuse by different versions of the corresponding first MES information entity or by different first MES information entities; and e) means (e.g. computer, processor, memory and/or software) for creating the new version of the first MES information entity with:

e1) means (e.g. computer, processor, memory and/or software) for replacing, for an updated second MES information entity, the link to an existing version of the entity by a link to the new version thereof;

e2) means (e.g. computer, processor, memory and/or software) for adding links to newly created second MES information entities; and e3) means (e.g. computer, processor, memory and/or software) for deleting links to the second MES information entities corresponding to sets of data deleted from a design information entity.

Other features which are considered as characteristic for the invention are set forth in the appended claims.

Although the invention is illustrated and described herein as embodied in a method, a system and computer readable medium for managing design updates in a manufacturing execution system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 2 is an illustration of a PPR reuse;
and
FIG. 3 is a flow chart according to the invention.

DETAILED DESCRIPTION OF THE INVENTION

According to the present invention, a manufacturing process in a plant is controlled via a MES system. The MES system is provided with a product definition model similar to the one disclosed in FIG. 21 of Part 1 of the ISA-S95 standard [B]. In the product definition model there are MES information entities of different types, with at least a first MES information entity, i.e. a product production rule (PPR), and a second MES information entity, i.e. a product segment (PS).

As stated, the MES can receive information defining the manufacturing specifications for a specific product (i.e. a recipe) from an external engineering environment. Consequently, the MES is to create a corresponding PPR and to keep the PPR aligned with MES-relevant changes possibly occurring in the recipe.

Figure 1A:
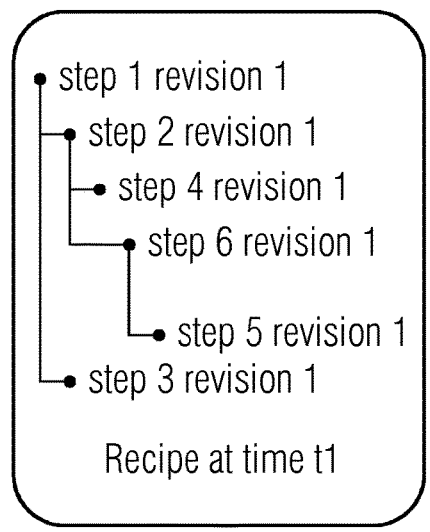
FIGS. 1A-1D are illustrations showing a product production rule (PPR) alignment.

Referring now to the drawings, FIG. 1A shows a recipe defined and stored in an external system at a time t1 ("original recipe"). The recipe has a number of steps (six in the FIG. 1A) defining the specifications for as many manufacturing phases. The steps in the original recipe are marked "revision 1". When downloading the original recipe to the MES system for the execution, a PPR (PPR v. 1.0, FIG. 1B) is created and is stored into a PPR catalog or database. In conventional manner, the PPR has as many steps as are the steps in the recipe. When downloading an original recipe, the whole data content of its steps are delivered to the MES system. Recipe steps that are downloaded with all their data are shown by black dots in all the figures.

The data of the recipe steps are converted into data of corresponding PSs—in terms of bills of resources (materials, tools, equipment and personnel), electronic work instructions, process parameters and so on—and such data, instead of being included into the PPR, are stored in a PS catalog or database (where they are still named "Steps").

Typically, given the tight relationships among the PPRs and the PSs, such entities are stored into the same database, even though in different tables (the catalogs).

A PPR step in turn merely includes a link ("PSTreeLink") to the corresponding PS in the catalog: therefore, it can be called a "light" step and the PPR will be a "light PPR", smaller than a standard one. The concept of light PPRs is already known from the SIMATIC® product family.

For the purposes of the invention, also the PSs are created and stored as versioned entities, by using the standard MES versioning: so the PSs created at time t1 will be version 1.0.

Figure 1C:
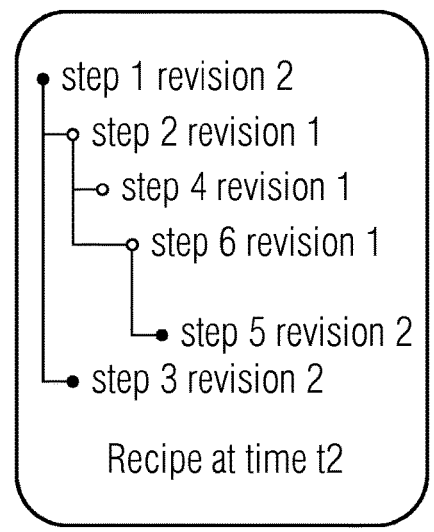
Figure 1B:
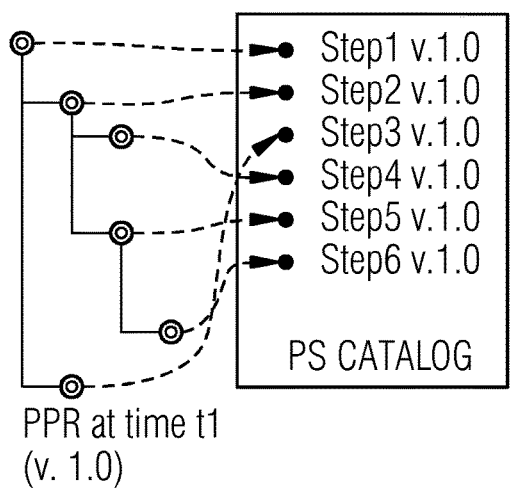

FIG. 1C shows the updated recipe at time t2. The update is assumed to have modified steps 1, 3, 5 with changes that are all MES-relevant and that require creating a new version of the PPR in the MES. The steps modified are written in italic. The updated recipe thus contains revision 2 of modified steps 1, 3, 5 and revision 1 of unchanged steps 2, 4, 6.

The invention moves from the consideration that the external engineering environment of course knows the delta updates of the recipe, so it can download a "differential package" to the MES system instead of downloading again the whole recipe, as it would occur by applying the standard methodology.

The differential package consists of:
a) the full data for each path to the node or step that was affected by the change;
b) a reference or identification for each node that was not affected by the change (shown in FIG. 1B as a circle); and
c) optionally, the level of hierarchy, if any, immediately below a changed node; this information is not required if the step identification is univocal in a same PPR, as is for instance the case for the aforementioned SIMATIC® product family.

Figure 1D:
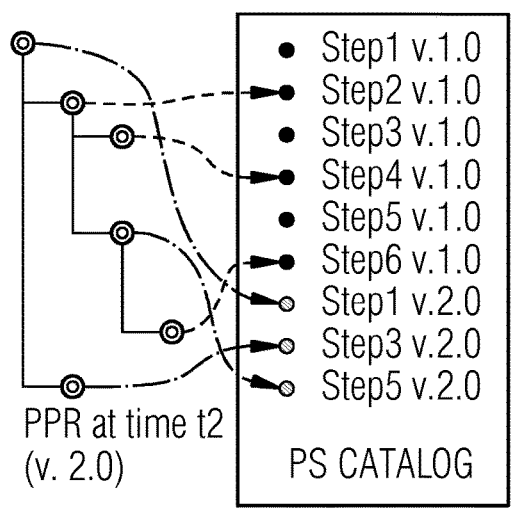

As shown in FIG. 1D, upon reception of such a differential package, PSs (steps) 1, 3, 5 corresponding to the updated recipe steps are updated and the PS catalog is supplemented with the updated version thereof (v. 2.0, shown by hatched dots). The new PPR v.2.0 is consequently created and stored in the PPR catalog. The PPR v.1.0 is structurally a copy of the PPR v.1.0, but the PSTreeLinks for steps 1, 3, 5 point now to version 2.0 of the corresponding PSs in the catalog. The PPR v. 2.0 is stored into the PPR catalog, where also the previous version 1.0 is maintained for the sake of traceability.

Since the PPRs only contain links to the PSs in the catalog, there is no data duplication at the PPR level in the database. The PS catalog will include the data of both the original and the updated steps, and the original data are always available even after an update. Thus, PSs that are not changed when the various imports occur can be reused by different versions of the same PPR or by different PPRs.

This means that each PS in the catalog can be referenced by multiple PSTreeLinks, as shown in FIG. 2. In particular, versions 1.0 and 2.0 of the PPR share the PSs that are not changed. In particular the two versions differ only for three linked steps: Step1, Step3 and Step5. For these steps a new version is created in the catalog, in order to preserve the structure of PPR version 1.0 and at the same time to align the MES system with the changes made at the recipe level.

We have depicted an update keeping the same number of steps as the original recipe. Should a new step be introduced in the recipe, the PS catalog would be supplemented with a corresponding new PS and the updated PPR would be supplemented with a new PSTreeLink. In case of step deletion, the corresponding PSTreeLink would be deleted from the PPR, but the concerned PS is maintained in the catalog to allow reuse, as in the case of a change.

The method of the invention is summarized in the flow chart of FIG. 3. At steps 100, 101 an original recipe is downloaded to the MES, the PSs are created and stored into the PS catalog as versioned PSs and a light PPR, with links to the PSs catalog is created and stored into the PPR catalog. When an update requiring updating of the PPR takes place in the recipe (step 102), the differential package is prepared and downloaded (step 103). At step 104, the PSs catalog is supplemented with new versions of the modified PSs and, possibly, with new PSs, while maintaining existing PS versions for reuse by other PPRs. In turn, the PPR is updated by making the existing PSTreeLinks concerned by the update link to the updated PS versions, by adding PSTreeLinks linking to the new PSs and by deleting PSTreeLinks corresponding to deleted PSs. The updated PPR is stored into the catalog.

In addition to the embodiments of the present invention described above, the skilled persons in the art will be able to arrive at a variety of other arrangements and steps which, if not explicitly described in this document, nevertheless fall within the scope of the appended claims.

LIST OF CITED STANDARDS

[A] Part 2 of ISA-S95 standard:
ISA-Draft S95.00.02
Enterprise—Control System Integration
Part 2: Object model attributes
Draft 5, August 2000
[B] Part 1 of the ISA-S95 standard:
ISA-Draft S95.00.01-2000
Enterprise—Control System Integration
Part 1: Models and Terminology
Draft 15, January 2000
[C] Part 1 of ANSI/ISA-88 standard:
ANSI/ISA-88.01-1995
Batch Control: Models and Terminology

The invention claimed is:

1. A method for managing product definition updates for controlling a manufacturing process via a manufacturing execution system (MES system), which comprises the steps of:
a) downloading from an external engineering environment to the MES system design information entities each defining manufacturing specifications for a specific product and including sets of data concerning different manufacturing steps, the design information entities and the sets of data being updated whenever the manufacturing specifications for the specific product change and being downloaded to the MES system at creation and at each update entailing MES-relevant changes;
b) creating within the MES system, at a first download of a design information entity, first and second MES information entities where each first MES information entity has associated second MES information entities each including data for a manufacturing step for the specific product, creating the second MES information entities as versioned entities, the creating step including:
b1) creating a new version of the second MES information entities at each download of an updated corresponding design information entity and storing the second MES information entities with their data into a database of the second MES information entities;
b2) creating a new version of the first MES information entity at each download of the updated corresponding design information entity by including into the first MES information entity, for each second MES information entity associated thereto, a link to the second MES information entity in the database; and
b3) storing the first MES information entities into a database of the first entities;
performing at each of the updates of the design information entity, the further following steps of:
c) downloading a differential package including a whole of the data for a set having undergone changes and for newly added sets, and an identification of unchanged sets;
d) creating and storing into the database a new version of the second MES information entities corresponding to sets having undergone changes and/or additional second MES information entities corresponding to sets of data that have been added, while maintaining existing versions of the second MES information entities for reuse by different versions of the corresponding first MES information entity or by different first entities thus avoiding a need to store and replicate for changed manufacturing specifications unchanged second MES information entities;
e) creating the new version of the first MES information entity by:
e1) replacing, for an updated second MES information entity, the link to an existing version of the entity by a link to the new version thereof;
e2) adding links to newly created second MES information entities; and
e3) deleting links to second MES information entities corresponding to sets of data deleted from a design information entity and
manufacturing the specific product based on the new version of the first and second MES information entities.

2. The method according to claim 1, wherein, in case of a hierarchical structure of the design information entities, the differential package further includes information about a level of hierarchy immediately below a set of data having undergone changes.

3. The method according to claim 1, wherein the first and second MES information entities belong to a product definition model taken from ISA-S95 standard and are product production rule entities and product segment entities, respectively.

4. A computer, comprising:
a non-transitory computer readable medium with computer-executable instructions to be executed on the computer for performing a method for managing product definition updates for controlling a manufacturing process via a manufacturing execution system (MES system), which method comprises the steps of:
a) downloading from an external engineering environment to the MES system design information entities each defining manufacturing specifications for a specific product and including sets of data concerning different manufacturing steps, the design information entities and the sets of data being updated whenever the manufacturing specifications for the specific product change and being downloaded to the MES system at creation and at each update entailing MES-relevant changes;

b) creating within the MES system, at a first download of a design information entity, first and second MES information entities where each first MES information entity has associated said second MES information entities each including data for a manufacturing step for the specific product, creating the second MES information entities as versioned entities, the creating step including:

b1) creating a new version of the second MES information entities at each download of an updated corresponding design information entity and storing the second MES information entities with their data into a database of the second MES information entities;

b2) creating a new version of the first MES information entity at each download of the updated corresponding design information entity by including into the first MES information entity, for each second MES information entity associated thereto, a link to the second MES information entity in the database; and b3) storing the first MES information entities into a database of the first entities;

performing at each of the updates of the design information entity, the further following steps of:

c) downloading a differential package including a whole of the data for a set having undergone changes and for newly added sets, and an identification of unchanged sets;

d) creating and storing into the database a new version of the second MES information entities corresponding to sets having undergone changes and/or additional second MES information entities corresponding to sets of data that have been added, while maintaining existing versions of the second MES information entities for reuse by different versions of the corresponding first MES information entity or by different first entities thus avoiding a need to store and replicate for changed manufacturing specifications unchanged second MES information entities; and e) creating the new version of the first MES information entity by:

e1) replacing, for an updated second MES information entity, the link to an existing version of the entity by a link to the new version thereof;

e2) adding links to newly created second MES information entities; and e3) deleting links to second MES information entities corresponding to sets of data deleted from a design information entity.

5. A non-transitory computer readable medium having computer-executable instructions to be executed on a computer for performing a method for managing product definition updates for controlling a manufacturing process via a manufacturing execution system (MES system), which method comprises the steps of:

a) downloading from an external engineering environment to the MES system design information entities each defining manufacturing specifications for a specific product and including sets of data concerning different manufacturing steps, the design information entities and the sets of data being updated whenever the manufacturing specifications for the specific product change and being downloaded to the MES system at creation and at each update entailing MES-relevant changes;

b) creating within the MES system, at a first download of a design information entity, first and second MES information entities where each first MES information entity has associated second MES information entities each including data for a manufacturing step for the specific product, creating the second MES information entities as versioned entities, the creating step including:

b1) creating a new version of the second MES information entities at each download of an updated corresponding design information entity and storing the second MES information entities with their data into a database of the second MES information entities;

b2) creating a new version of the first MES information entity at each download of the updated corresponding design information entity by including into the first MES information entity, for each second MES information entity associated thereto, a link to the second MES information entity in the database; and b3) storing the first MES information entities into a database of the first entities;

performing at each of the updates of the design information entity, the further following steps of:

c) downloading a differential package including a whole of the data for a set having undergone changes and for newly added sets, and an identification of unchanged sets;

d) creating and storing into the database a new version of the second MES information entities corresponding to sets having undergone changes and/or additional second MES information entities corresponding to sets of data that have been added, while maintaining existing versions of the second MES information entities for reuse by different versions of the corresponding first MES information entity or by different first entities thus avoiding a need to store and replicate for changed manufacturing specifications unchanged second MES information entities; and e) creating the new version of the first MES information entity by:

e1) replacing, for an updated second MES information entity, the link to an existing version of the entity by a link to the new version thereof;

e2) adding links to newly created second MES information entities; and e3) deleting links to second MES information entities corresponding to sets of data deleted from a design information entity.

6. The non-transitory computer readable medium according to claim 5, wherein in case of a hierarchical structure of the design information entities, the differential package further includes information about a level of hierarchy immediately below a set of data having undergone changes.

7. The non-transitory computer readable medium according to claim 5, wherein the first and second MES information entities belong to a product definition model taken from ISA-S95 standard and are product production rule entities and product segment entities, respectively.

* * * * *